UNITED STATES PATENT OFFICE.

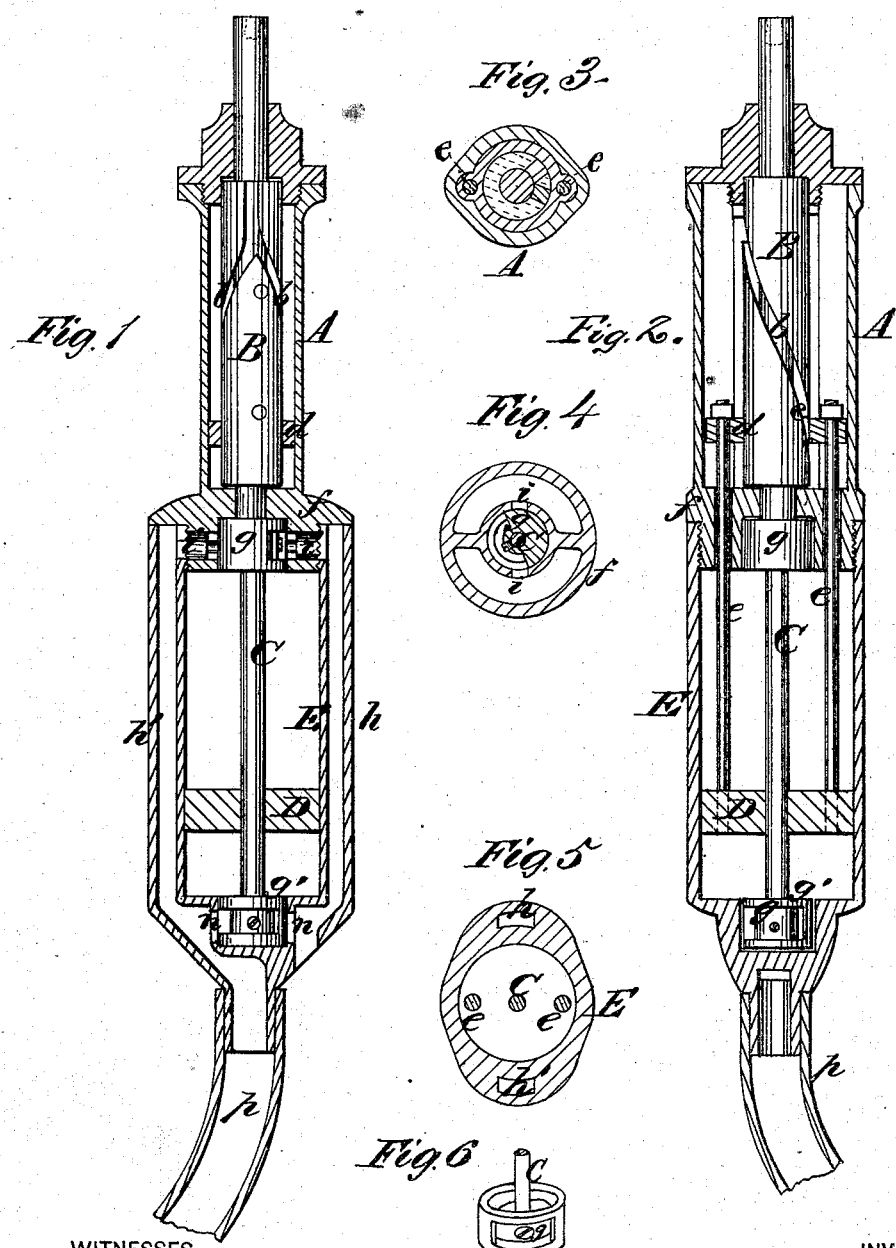
C. W. RILEY.
Air Hand-Engine.
No. 165,027. Patented June 29, 1875.

CHARLES W. RILEY, OF PHILADELPHIA, PENNSYLVANIA.

IMPROVEMENT IN AIR HAND-ENGINES.

Specification forming part of Letters Patent No. 165,027, dated June 29, 1875; application filed March 27, 1875.

*To all whom it may concern:*

Be it known that I, CHARLES W. RILEY, of Philadelphia, in the county of Philadelphia and State of Pennsylvania, have invented a new and valuable Improvement in Air Hand-Engines; and do hereby declare that the following is a full, clear, and exact description of the construction and operation of the same, reference being had to the annexed drawings, making a part of this specification, and to the letters and figures of reference marked thereon.

Figures 1 and 2 of the drawings are representations of vertical central sections of my machine, and Fig. 3, 4, 5, and 6, are detail views:

This invention has relation to engines which are driven by compressed air and held in the hand when used, and which are designed for dentists, wood-carvers, wood-engravers, and others; and the nature of my invention consists in the combination of a rotating tool-holder, rotating valves, a piston, and induction and eduction air-passages, with a case which serves as a convenient handle, as will be understood from the following description.

In the annexed drawing, A designates a cylinder, in which is applied a spindle, B, the ends of which have their bearings in the ends of the cylinder A. The reduced and exposed end of the spindle B has a socket in it for the attachment of a drill or other instrument, and the opposite end of the spindle has a socket in it to receive the flattened end of a valve-stem, C. The spindle B has two oblique grooves, $b\ b$, in it, which communicate with each other at their extremities. In the grooves $b\ b$ plays a feather, $c$, which is formed on a reciprocating yoke, $d$, to which two piston-rods, $e\ e$, are secured. The piston-rods pass through the end $f$ of cylinder A, and are secured to a piston, D, which works in a case, E, screwed on the end $f$ of cylinder A. A circular recess is made in the center of the end $f$, in which recess rotates a cylindrical valve, $g$, which is fast on one end of the stem C. The stem C passes freely through the center of the piston D, and has fixed on its opposite end a valve, $g'$, similar in construction to the valve $g$. In the end $f$ of the cylinder A are two ports, $i\ i$, which are diametrically opposite each other, and which establish communication, at proper times, between the interior of the case E on one side of the piston D, and two air-passages, $h\ h'$. Two ports, $n\ n$, establish communication between the interior of the case E on the opposite side of the piston D and the passages $h\ h'$.

Air under pressure is taken from a suitable reservoir by means of a flexible pipe, $p$, and conducted into the engine through the passage $h$, which leads through a passage, $i$, and valve $g$, into the case E, on one side of the piston. When the piston has made the stroke represented in Figs. 1 and 2 of the drawing, valve $g$ closes its inlet-port $i$ and opens its exhaust-port $i$. At the same time valve $g'$ opens its inlet-port $n$ and closes its exhaust-port. The piston now makes another stroke. These rectilinear movements of the piston D communicate a rotary movement to the spindle by reason of feather $c$ traversing the oblique grooves $b\ b$, which rotary movement is imparted to the two valves $g\ g'$. Valves $g\ g'$ are cylinders, having recesses in their ends, and slots through their sides, as shown in Fig. 6, so that the air in entering and leaving the interior of the case E will pass through these valves.

What I claim as new, and desire to secure by Letters Patent, is—

In a hand air-engine, the rotary tool-spindle B, having oblique grooves $b\ b$, in combination with the yoke $d$, having a feather, $c$, and connected with the piston D, valves $g\ g'$, and induction and eduction ports, substantially as described.

In testimony that I claim the above I have hereunto subscribed my name in the presence of two witnesses.

CHARLES W. RILEY.

Witnesses:
ALLEN H. GANGEWER,
E. FARREN.